US011117084B2

(12) United States Patent
Neef et al.

(10) Patent No.: US 11,117,084 B2
(45) Date of Patent: Sep. 14, 2021

(54) FILTER ELEMENT, IN PARTICULAR FOR GAS FILTRATION

(71) Applicant: MANN+HUMMEL GmbH, Ludwigsburg (DE)

(72) Inventors: Pascal Neef, Leonberg (DE); Nadine Donauer, Fellbach (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 179 days.

(21) Appl. No.: 16/374,879

(22) Filed: Apr. 4, 2019

(65) Prior Publication Data

US 2019/0224608 A1 Jul. 25, 2019

Related U.S. Application Data

(63) Continuation of application No. PCT/EP2017/075513, filed on Oct. 6, 2017.

(30) Foreign Application Priority Data

Oct. 7, 2016 (DE) .................... 10 2016 011 950.0

(51) Int. Cl.
*B01D 46/52* (2006.01)
*B01D 46/10* (2006.01)
(Continued)

(52) U.S. Cl.
CPC ....... *B01D 46/521* (2013.01); *B01D 46/0002* (2013.01); *B01D 46/10* (2013.01);
(Continued)

(58) Field of Classification Search
CPC .......... B01D 2271/02; B01D 2271/022; B01D 46/521; B01D 2271/027; B01D 46/0002;
(Continued)

(56) References Cited

U.S. PATENT DOCUMENTS

| 4,498,989 A | 2/1985 | Miyakawa et al. |
|---|---|---|
| 10,561,969 B2 | 2/2020 | Sorger et al. |

(Continued)

FOREIGN PATENT DOCUMENTS

| DE | 4218396 A1 | 12/1993 |
|---|---|---|
| DE | 19748974 C1 | 6/1999 |

(Continued)

OTHER PUBLICATIONS

Title: Axial gewellte Dichtung, Published on Sep. 5, 2011, 2 pages, published on https://ip.com/.

*Primary Examiner* — Robert Clemente
(74) *Attorney, Agent, or Firm* — James Hasselbeck

(57) ABSTRACT

A filter element has a filter medium body and sealing material strips extending at least partially circumferentially in a circumferential direction of the filter medium body at an inflow side of the filter medium body and at least at one additional side of the filter medium body. A first one of the sealing material strips carries at least one holding tab. The at least one holding tab projects past the first sealing material strip. The at least one holding tab is embodied at least partially of a material of the first sealing material strip. A filter device with such a filter element arranged in a filter housing is provided.

21 Claims, 3 Drawing Sheets

(51) Int. Cl.
*B01D 46/42* (2006.01)
*B01D 46/00* (2006.01)

(52) U.S. Cl.
CPC .... *B01D 46/4227* (2013.01); *B01D 2271/022* (2013.01); *B01D 2275/20* (2013.01); *B01D 2275/206* (2013.01)

(58) Field of Classification Search
CPC ............... B01D 46/10; B01D 46/4227; B01D 2275/20–208
See application file for complete search history.

(56) References Cited

U.S. PATENT DOCUMENTS

| | | |
|---|---|---|
| 2002/0150806 A1 | 10/2002 | Stenersen et al. |
| 2003/0066424 A1 | 4/2003 | Shah |
| 2003/0177745 A1 | 9/2003 | Jauw |
| 2009/0151311 A1 | 6/2009 | Reichter et al. |
| 2009/0301045 A1* | 12/2009 | Nelson ................ B01D 46/521 55/498 |
| 2009/0320423 A1 | 12/2009 | Merritt et al. |
| 2010/0258493 A1 | 10/2010 | Kindkeppel et al. |
| 2013/0000267 A1 | 1/2013 | Merritt |
| 2016/0023137 A1 | 1/2016 | Sorger et al. |
| 2016/0045848 A1* | 2/2016 | Campbell ............ B01D 46/009 55/357 |
| 2016/0236128 A1 | 8/2016 | Campbell et al. |
| 2018/0361294 A1 | 12/2018 | Neef et al. |
| 2018/0361296 A1 | 12/2018 | Neef et al. |

FOREIGN PATENT DOCUMENTS

| | | |
|---|---|---|
| DE | 19859854 A1 | 6/2000 |
| DE | 102010025971 A1 | 1/2012 |
| DE | 102010025971 B4 | 1/2012 |
| DE | 102012000470 A1 | 7/2013 |
| DE | 102012005731 A1 | 2/2014 |
| DE | 102014000414 A1 | 8/2014 |
| DE | 112014003011 T5 | 3/2016 |
| DE | 102015001225 A1 | 8/2016 |
| EP | 0863785 B1 | 9/1998 |
| EP | 1137474 B1 | 10/2001 |
| EP | 1736227 B1 | 12/2006 |
| EP | 1996305 A2 | 8/2007 |
| EP | 2802403 A1 | 7/2013 |
| EP | 2827966 A1 | 9/2013 |
| JP | 2000130272 A | 5/2000 |
| WO | 2013104796 A1 | 7/2013 |
| WO | 2013139992 A1 | 9/2013 |

* cited by examiner

FILTER ELEMENT, IN PARTICULAR FOR GAS FILTRATION

CROSS-REFERENCE TO RELATED APPLICATIONS

This application is a continuation application of international application No. PCT/EP2017/075513 having an international filing date of 6 Oct. 2017 and designating the United States, the international application claiming a priority date of 7 Oct. 2016 based on prior filed German patent application No. 10 2016 011 950.0, the entire contents of the aforesaid international application and the aforesaid German patent application being incorporated herein by reference.

BACKGROUND OF THE INVENTION

The invention relates to a filter element, in particular for gas filtration, for example, for an air filter, with a filter medium body which is provided respectively at the inflow side and at least at one additional side with a sealing material strip that extends at least partially circumferentially.

DE 10 2010 025 971 B4 describes an air filter that is used for filtration of the intake air of internal combustion engines. The air filter comprises a parallelepipedal filter medium body which is embodied as a folded filter and comprises adhesive beads for separation of the raw side from the clean side.

EP 0 863 785 B1 also describes a filter element with a parallelepipedal filter medium body embodied as a folded filter. The filter medium body is framed by a frame that comprises a circumferentially extending receiving pocket for receiving a sealing element. The receiving pocket with the sealing element projects laterally past the side wall of the filter medium body.

SUMMARY OF THE INVENTION

It is the object of the invention to configure with simple constructive measures a filter element so as to be service-friendly, in particular to reduce the introduction of local forces onto a filter medium body of the filter element during handling of the filter element, in particular when inserting and removing the filter element.

This object is solved according to the invention in that at least one sealing material strip is carrier of at least one holding tab projecting past the sealing material strip, wherein the holding tab is embodied at least partially of the material of the sealing material strip. The dependent claims provide expedient further developments.

The filter element according to the invention is used preferably for gas filtration, for example, as an air filter in the intake manifold of an internal combustion engine, in particular for a truck. However, a use of the filter element for liquid filtration is also conceivable.

The filter element comprises a filter medium body which is manufactured from a filter material and at which the filtration is taking place. At the filter medium body, a sealing material strip is provided respectively at the inflow side and at least at one additional side, in particular at the oppositely positioned outflow side, and is configured to at least partially extend circumferentially at the respective side and preferably is positioned in a rim region of the filter medium body. In particular at the inflow side, the sealing material strip extends continuously and completely circumferentially and forms a sealing element for separation of the raw side, which is formed by the inflow side, from the clean side of the filter element, which is formed by the outflow side. The at least one additional side which is provided with a sealing material strip is preferably the outflow side at which the sealing material strip is embodied circumferentially, either with interruption or continuously.

At least one sealing material strip at one side is carrier of a projecting holding tab that makes it possible to grip the filter element in particular manually and to insert it into a receiving filter housing or to remove it therefrom. The holding tab according to the invention is embodied at least partially of the material of the sealing strip; in particular, the holding tab consists of the material of the sealing strip. Suitable materials for the sealing strip or for the holding tab is plastic material, preferably elastomers, particularly preferred polyurethane. This has the advantage that the holding tab is producible particularly simply and is configured also constructively in a simple way. The holding tab is moreover flexible and is reversibly deformable, as needed, for insertion and removal in a user-friendly way. In case that the holding tab consists of the material of the sealing strip, in particular is formed as one piece therewith, an additional advantage is the particularly simple and inexpensive manufacture because no additional processing time is required. The forces for the insertion or removal of the filter element are transmitted via the holding tab to the sealing material strip wherein, via the sealing material strip, a force distribution to the filter medium body is achieved across a large surface area. In this way, a local introduction of high forces to the filter medium body, which might cause damage to the filter material, is avoided. At the same time, manageability of the filter element is significantly improved.

At least one holding tab is provided at the sealing material strip. In principle, it is sufficient to provide exactly one holding tab wherein, according to a preferred embodiment, a plurality of holding tabs are provided, for example, at least two holding tabs arranged at oppositely positioned sides. At least two holding tabs are particularly advantageous in order to dismount or remove the filter element in a simple and safe way in axial direction. In case of at least two holding tabs, the moment which is acting on the filter element upon removal and which may lead to canting of the filter element during dismounting is smaller in comparison to the moment for one holding tab.

The at least two holding tabs in a further embodiment can be arranged displaced relative to each other in circumferential direction, wherein the at least two holding tabs can be arranged moreover at oppositely positioned sides. The displaced arrangement has the additional advantage of a constructively simple, reliable installability. Due to the arrangement of the two holding tabs, the determination of the installation position is also possible for removal and reinstallation of the filter element. In this way, upon removal and in particular reinstallation of the same already laden filter element, the same installation position can be ensured. Changes or deviations in the installation position of the filter element, in particular upon reinstallation of the same filter element, can have a relevant effect on flow and thus on the signal quality of a possible air flow meter in the clean air manifold.

The at least one holding tab is located preferably at the side of the filter medium body provided with a continuous sealing material strip extending circumferentially without interruption. This embodiment is in particular provided at the inflow side of the filter medium body. However, an arrangement of the at least one holding tab at a non-continuously embodied sealing material strip, for example, at the outflow side, is conceivable also. It is also possible to respectively arrange at least one holding tab at various sides, for example, at the inflow side one or several holding tabs as well as at the outflow side one or several holding tabs.

According to yet another expedient embodiment, the holding tab extends parallel to the insertion or removal direction of the filter element in the filter housing; accordingly, the holding tab projects in insertion or removal direction past the sealing material strip. The holding tab has preferably only the function that the filter element can be gripped more easily by means of the holding tab; however, the holding tab has no support function for the filter element at the receiving filter housing.

Provided that at least two holding tabs are arranged which are positioned at the same sealing material strip but displaced in circumferential direction, it can be expedient to arrange these two holding tabs in such a way that a connecting line between the holding tabs intersects an axis through the center of gravity of the filter element or at least is positioned close to the axis of gravity. In this way, it is ensured that, when simultaneously gripping the filter element by means of the two holding tabs, the filter element can be lifted and lowered in a balanced and even way and an undesirable canting of the filter element, which would lead to a difficult insertion or removal of the filter element, is avoided.

According to yet another expedient embodiment, the sealing material strip and the at least one holding tab are formed as one piece. Accordingly, the holding tab is also comprised of the same sealing material as the sealing material strip. In an alternative embodiment, the sealing material strip and holding tabs are separately embodied but connected to each other so that also in this case the forces acting upon removal and insertion on the holding tabs are transferred to the sealing material strip and farther to the filter medium body.

According to yet another expedient embodiment, the sealing material strip projects laterally past the outer side of the filter medium body. In contrast thereto, the holding tab comprises a spacing relative to the outer rim of the sealing material strip so that the holding tab does not project relative to the filter medium body but is located adjacent to the rim region of the filter medium body. This embodiment ensures that, when gripping the filter element by means of the at least one holding tab, the forces, with avoidance of additional moments, are introduced immediately through the sealing material strip into the filter medium body.

The projecting section of the sealing material strip can be provided with a downwardly oriented receiving groove into which a sealing element can be inserted. The open side of the receiving groove is facing the oppositely positioned side of the filter medium body and comprises preferably a lateral spacing to the neighboring outer side of the filter medium body.

According to yet another expedient embodiment, the filter medium body is embodied as a folded filter with a plurality of individual filter folds. The sealing material strip extends, at least with sections thereof, transversely to the filter folds along the rim region of the filter medium body. At least one section of the sealing material strip extends in this context transversely to the filter folds, wherein at least one holding tab is arranged at this section of the sealing material strip. Due to the transverse direction of the sealing material strip relative to the filter folds, the filter medium body is stabilized by the sealing material strip and the forces exerted upon removal and insertion via the holding tab are distributed across a greater number of filter folds.

In an embodiment of the filter medium body as a folded filter, the sealing material strip is applied onto the filter medium body and accommodates the fold tips. The sealing material can be injection-molded or cast on so that a fixed connection between the sealing material strip and the filter material of the filter medium body is produced.

According to yet another expedient embodiment, at least one adhesive bead which extends transversely to the filter folds is applied onto the fold tips. The adhesive bead extends in particular parallel to the section of the sealing material strip which receives at least one holding tab. According to a further advantageous embodiment, an adhesive bead extends also below the sealing material strip.

According to a further expedient embodiment, the filter medium body is embodied parallelepipedal, i.e., the base surface of the filter medium body is substantially rectangular or the filter medium body has a substantially rectangular cross section. The sealing material strip is configured expediently also substantially rectangular in this embodiment.

The invention concerns moreover a filter device with a filter element as described above and with a filter housing serving for receiving the filter element. The filter housing comprises in particular a filter base housing as well as a housing cover to be placed onto the filter base housing. In one housing component, in particular the housing cover, a recess is preferably provided for receiving the holding tab provided at the filter element. In case that several holding tabs are arranged at the filter element, several recesses are correspondingly provided in the housing component. When placing the housing cover on the filter base housing, the holding tabs engage the recesses in the housing cover.

According to a further expedient embodiment, the height or the projection of the holding tab extending past the sealing material strip in relation to the total height of the filter element amounts to 5% to 20%. For example, the height or the projection of the tab is in a range between 10 mm and 40 mm, in particular is 20 mm. For example, the length of the tab in the direction of length extension of the carrying sealing material strip is 15 mm to 60 mm and is 40 mm, for example, immediately at the connecting region to the sealing material strip. For example, the width of the tab, viewed transversely to the length, is between 3 mm and 15 mm, in particular is 6 mm to 10 mm.

BRIEF DESCRIPTION OF THE DRAWINGS

Further advantages and expedient embodiments can be taken from the additional claims, the figure description, and the drawings.

In the Figures, same components are provided with same reference characters.

DESCRIPTION OF PREFERRED EMBODIMENTS

Figure 1:
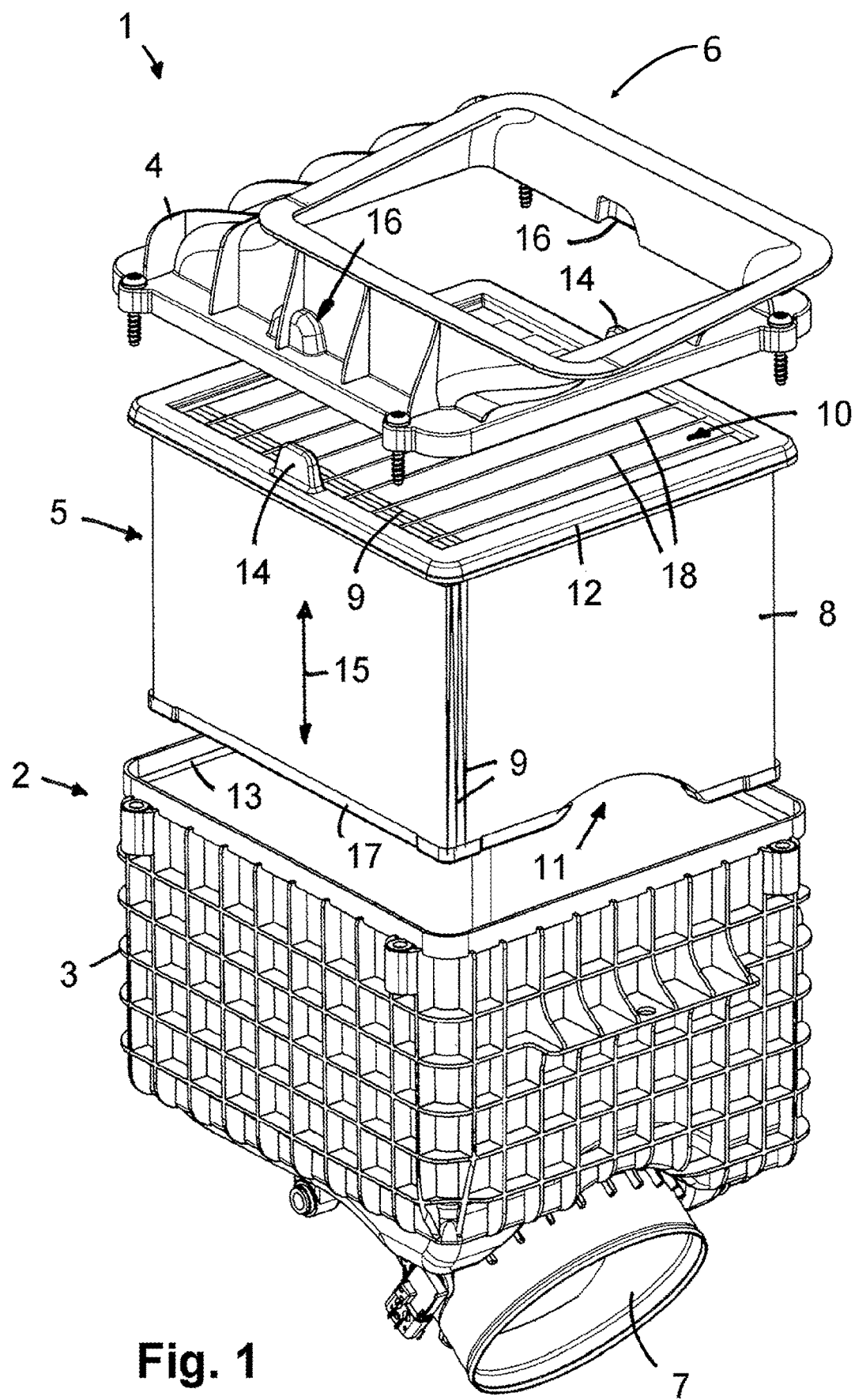
FIG. 1 shows in exploded illustration a filter device for gas filtration with a parallelepipedal filter element insertable into a filter base housing and with an attachable housing cover.

In FIG. 1, a filter device 1 is illustrated that can be used for gas filtration, in particular for air filtration in the intake manifold of an internal combustion engine. The filter device 1 comprises a filter housing 2 with a filter base housing 3 and an attachable housing cover 4, wherein a parallelepipedal filter element 5 in which the filtration is taking place is insertable into the filter base housing 3. After insertion of the filter element 5, the housing cover 4 is placed onto the filter base housing 3 and connected with screws thereto, whereby the filter element 5 is captively secured in the filter base housing 3. The supply of the uncleaned raw fluid is realized through a central opening 6 in the housing cover 4, the outflow of the purified fluid is realized through an outflow tube 7 at the bottom side of the filter base housing 3.

Figure 2:
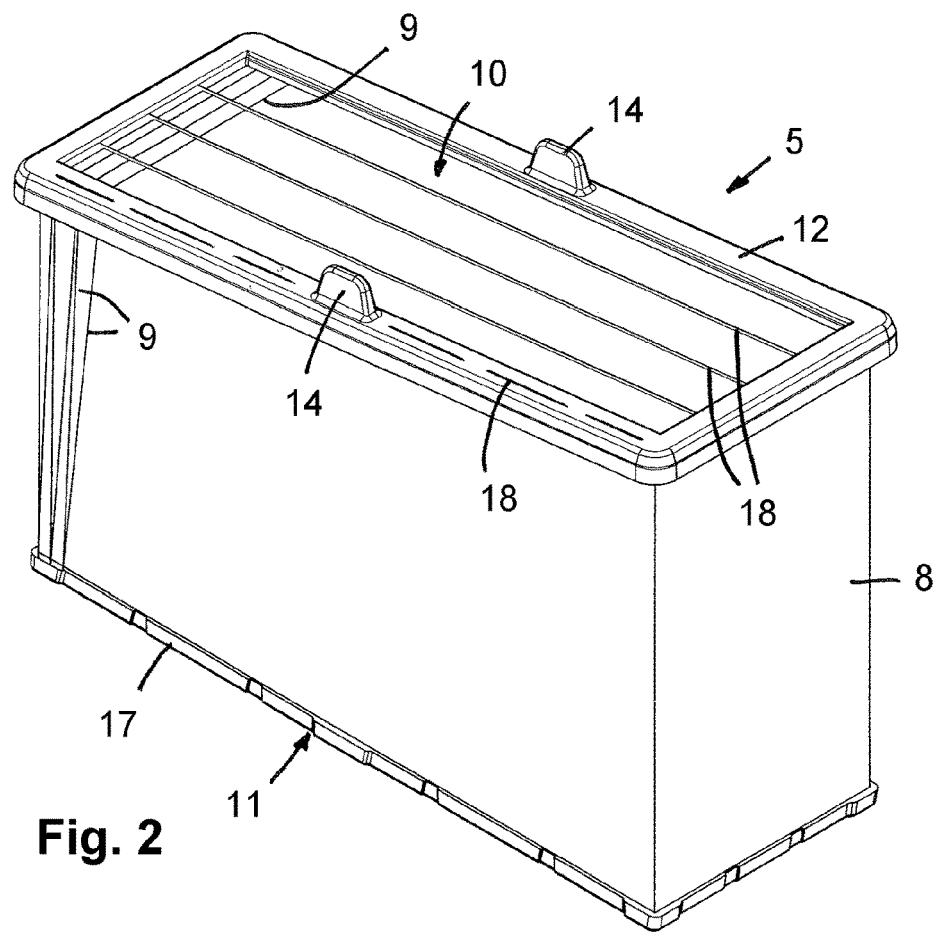
FIG. 2 shows a filter element in perspective individual illustration.
Figure 3:
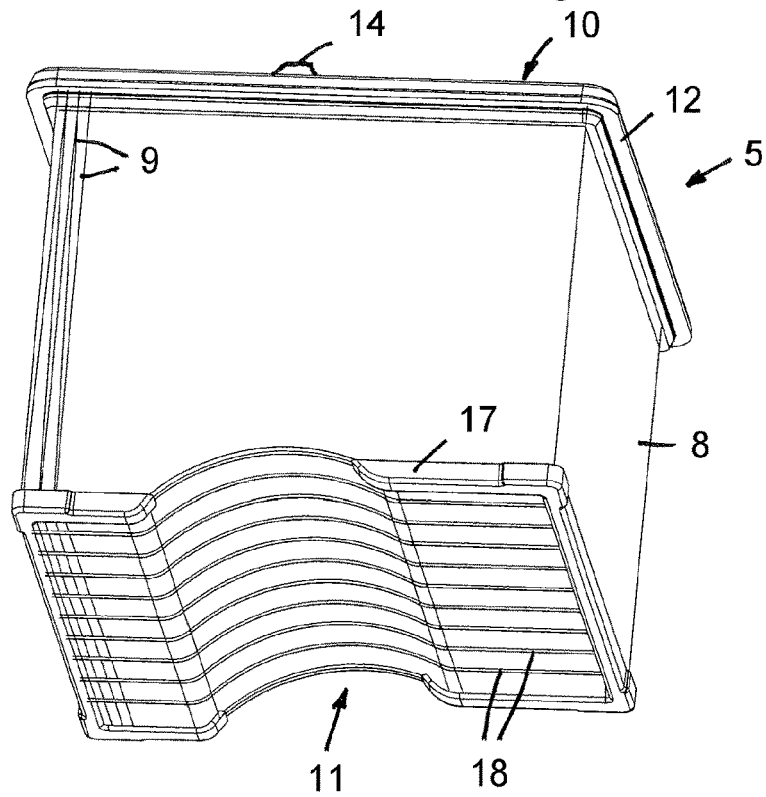
FIG. 3 shows a further filter element, illustrated in another perspective view.

As can be seen in FIG. 1 in connection with FIGS. 2 and 3, the parallelepipedal filter element 5 comprises a filter medium body 8 which is embodied as a folded filter with a plurality of filter folds 9. The filter folds 9 extend between the top inflow side 10 of the filter element 5, which is facing the housing cover 4, and the oppositely positioned bottom outflow side 11 which is facing the outflow tube 7 in the filter base housing 3. Accordingly, the fold tips of the filter folds 9 are positioned at the inflow side 10 and at the outflow side 11.

At the inflow side 10, the rim region of the filter medium body 8 is framed by a sealing material strip 12 which is embodied continuously and extends circumferentially. The sealing material strip 12 at the inflow side 10 forms a sealing element for flow-tight separation of the inflow side from the outflow side. The sealing material strip 12 projects laterally past the outer side of the filter medium body 8 wherein the laterally outwardly projecting region of the sealing material strip 12 forms a contact surface for contacting an inwardly positioned circumferentially extending shoulder 13 (FIG. 1) in the filter base housing 3.

At the sealing material strip 12 at the inflow side 10, holding tabs 14 are formed in oppositely positioned sections which are formed as one piece together with the sealing material strip 12. The holding tabs 14 extend parallel to the insertion and removal direction 15 (FIG. 1) in which the filter element 5 is inserted into the filter base housing 3 or removed therefrom. The holding tabs 14 project past the top side of the sealing material strip 12. Both holding tabs 14 have a lateral spacing relative to the outer rim of the sealing material strip 12 and are located centrally at the filter element 5. The holding tabs 14 are at least partially formed of the material of the sealing material strip; in particular, the holding tabs 14 consist of the material of the sealing strip.

Each holding tab 14 has correlated therewith a recess 16 at the bottom side of the housing cover 4. In the assembled state, the holding tabs 14 project into the correlated recesses 16 in the housing cover 4.

In the embodiment according to FIG. 1, the holding tabs 14 are provided at a section of the sealing material strip 12 which extends parallel to the filter folds 9. In the embodiment according to FIG. 2, on the other hand, the holding tabs 14 are located at a section of the circumferentially extending sealing material strip 12 which extends orthogonally or transversely to the filter folds 9. The embodiment according to FIG. 2 has the advantage that the holding forces which originate at the holding tabs 14 are distributed to a plurality of individual filter folds 9 via the correlated section of the sealing material strip 12.

A sealing material strip 17 is also located at the outflow side 11 in the rim region of the filter medium body 8. It is comprised in particular of the same sealing material as the sealing material strip 12 at the inflow side 10. In the embodiments according to FIGS. 1 and 3, the sealing material strip 17 at the outflow side 11 is not embodied to be continuous but comprises two parts and has an interruption at the center of the filter medium body at two sides, respectively. In the embodiment according to FIG. 2, on the other hand, the sealing material strip 17 at the outflow side 11 is embodied so as to be continuous and to extend circumferentially.

At the inflow side 10 as well as at the outflow side 11, adhesive or glue beads 18 are provided which extend transversely to the filter folds 9, respectively. At the inflow side 10 and at the outflow side 11, a plurality of parallel extending adhesive beads 18 are arranged, respectively. The adhesive beads 18 effect a stabilization and increase of stiffness of the filter medium body 8. As shown by a dashed line in FIG. 2, an adhesive bead 18 can also be arranged at the inflow side 10 below the section of the sealing material strip 12 which carries a holding tab 14.

Figure 4:
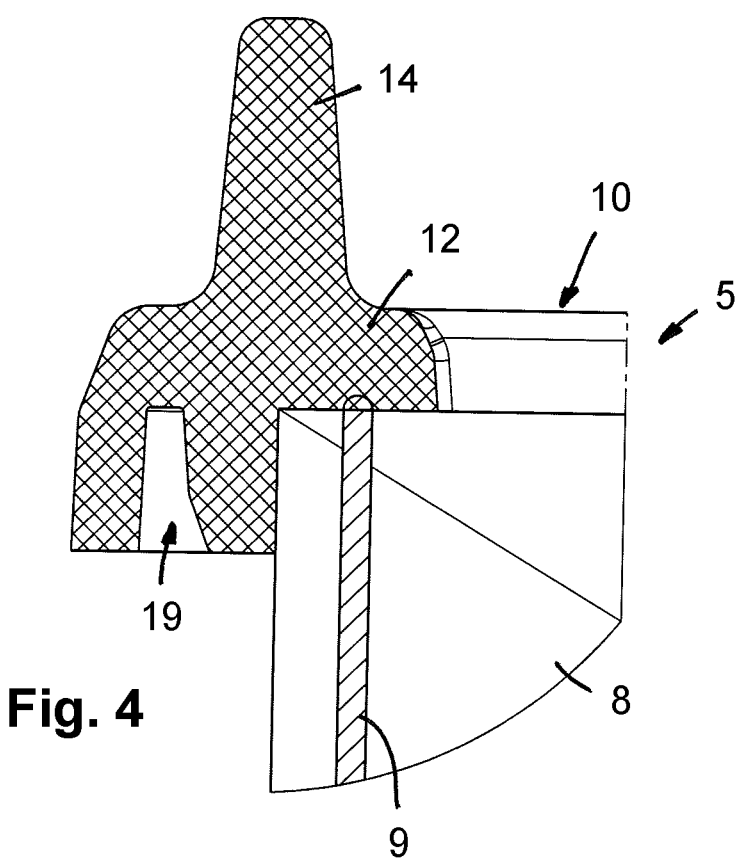
FIG. 4 shows a section of the rim region of the filter element with a sealing material strip that forms a sealing element.

As can be seen in the section illustration according to FIG. 4, the sealing material strip 12 at the inflow side 10 is provided with a downwardly oriented receiving groove 19 which is located in a section of the sealing material strip 12 with lateral spacing to the outer side of the filter medium body 8. The open side of the receiving groove 19 is positioned opposite the holding tab 14. The receiving groove 19 serves for accommodating the inwardly positioned circumferentially extending shoulder 13 (FIG. 1) in the filter base housing 3, in particular for receiving a circumferentially extending sealing element that, upon insertion of the filter element 5, is placed onto the shoulder 13 at the inner side of the filter base housing 3.

What is claimed is:
1. A filter element comprising:
a filter medium body;
sealing material strips extending at least partially circumferentially in a circumferential direction of the filter medium body at an inflow side of the filter medium body and at least at one additional side of the filter medium body;
wherein the sealing material strips include a first sealing material strip carrying at least one holding tab, wherein the at least one holding tab projects past the first sealing material strip, and wherein the at least one holding tab is embodied at least partially of a material of the first sealing material strip;
wherein the filter medium body is a folded filter comprising a plurality of individual filter folds;
the filter element further comprising at least one adhesive bead extending at fold tips of the individual filter folds in a direction transverse to the individual filter folds.
2. The filter element according to claim 1, wherein the at least one holding tab consists of the material of the first sealing material strip.
3. The filter element according to claim 1, wherein the first sealing material strip carrying the at least one holding tab is a continuously circumferentially extending sealing material strip.
4. The filter element according to claim 1, wherein two of said at least one holding tab are provided and are positioned so as to be displaced in the circumferential direction at the filter medium body.
5. The filter element according to claim 1, wherein the first sealing material strip projects laterally past an outer side of the filter medium body and
wherein the at least one holding tab is arranged at a spacing relative to an outer rim of the first sealing material strip.

6. The filter element according to claim 5, wherein
at least a portion of the at least one holding tab does not project laterally past the filter medium body.
7. The filter element according to claim 1, wherein
the at least one holding tab is embodied as one piece together with the first sealing material strip.
8. The filter element according to claim 1, wherein
the sealing material strips include a completely circumferentially extending sealing material strip arranged at the inflow side.
9. The filter element according to claim 1, wherein
the sealing material strips include a second sealing material strip arranged at the outflow side.
10. The filter element according to claim 1, wherein
the first sealing material strip comprises
a section extending transversely to the filter folds and
wherein the at least one holding tab is arranged at said section extending transversely to the filter folds.
11. The filter element according to claim 1, further comprising an adhesive bead of the at least one adhesive bead, extending below the first sealing material strip.
12. The filter element according to claim 1, wherein
the filter medium body is parallelepipedal.
13. The filter element according to claim 1, wherein
the first sealing material strip is arranged in a rim region of the filter medium body.
14. The filter element according to claim 1, wherein
the first sealing material strip is arranged at the inflow side, located at the inflow face of the filter medium body, and comprises
a receiving groove,
wherein the receiving groove is oriented away from the inflow side in a downward direction.
15. The filter element according to claim 14, wherein
the receiving groove is arranged in a section of the first sealing material strip at a lateral spacing to an outer side of the filter medium body.
16. The filter element according to claim 14, wherein
the receiving groove comprises
an open side that is facing away from the at least one holding tab.
17. A filter device comprising:
a filter element comprising
a filter medium body and
sealing material strips extending at least partially circumferentially in a circumferential direction of the filter medium body at an inflow side of the filter medium body and at least at one additional side of the filter medium body,
wherein the sealing material strips include a first sealing material strip carrying at least one holding tab,
wherein the at least one holding tab projects past the first sealing material strip, and
wherein the at least one holding tab is embodied at least partially of a material of the first sealing material strip;
wherein the filter medium body is a folded filter comprising a plurality of individual filter folds;
the filter element further comprising at least one adhesive bead extending at fold tips of the individual filter folds in a direction transverse to the individual filter folds;
a filter housing configured to receive the filter element.
18. The filter device according to claim 17, wherein
the filter housing comprises
a housing component and
the housing component comprises
a recess configured to receive the at least one holding tab.
19. The filter device according to claim 18, wherein
the housing component is a housing cover.
20. A filter element comprising:
a filter medium body having an inflow side and an outflow side;
wherein the filter medium body has an inflow face on the inflow side and an oppositely positioned outflow face on the outflow side;
wherein the filter medium body is a folder filter comprising a plurality of individual filter folds, the individual folds extending from the inflow face to the oppositely positioned outflow face, the in individual folds forming a first set of fold tips on the inflow face and a second set of fold tips on the outflow face, the fold tips extending laterally on a respective one of the flow faces;
wherein the filter medium body further includes
sealing material strips extending at least partially circumferentially in a circumferential direction of the filter medium body at an inflow side of the filter medium body and at least at one additional side of the filter medium body,
wherein the sealing material strips include a first sealing material strip carrying at least one holding tab, wherein the at least one holding tab projects past the first sealing material strip, and wherein the at least one holding tab is embodied at least partially of a material of the first sealing material strip;
wherein the first sealing material strip is arranged on the first set of fold tips of the filter medium body on the inflow face.
21. The filter element according to claim 20, wherein
the at least one holding tab consists of the material of the first sealing material strip;
wherein two of said at least one holding tab are provided and are positioned so as to be displaced apart in the circumferential direction at the filter medium body;
wherein the first sealing material strip projects laterally past an outer side of the filter medium body; and
wherein the at least one holding tab is arranged at a spacing relative to an outer rim of the first sealing material strip.

* * * * *